(12) United States Patent
Rokkjaer (10) Patent No.: US 6,644,340 B2
(45) Date of Patent: Nov. 11, 2003

(54) CORROSIVE RESISTANT LIQUID EXTRACTION APPARATUS

(76) Inventor: Henrik Rokkjaer, 19791 Bahama St., Northridge, CA (US) 91324

( * ) Notice: Subject to any disclaimer, the term of this patent is extended or adjusted under 35 U.S.C. 154(b) by 21 days.

(21) Appl. No.: 09/827,070

(22) Filed: Apr. 4, 2001

(65) Prior Publication Data

US 2002/0148504 A1 Oct. 17, 2002

(51) Int. Cl.[7] .............. F16L 37/248; F16L 37/252; F16L 55/07
(52) U.S. Cl. .............. 137/322; 137/212; 137/320; 220/293; 220/303; 222/400.7
(58) Field of Search .............. 137/212, 320, 137/321, 322; 222/400.7; 220/293, 303

(56) References Cited

U.S. PATENT DOCUMENTS

| | | | | |
|---|---|---|---|---|
| 3,473,556 A | * | 10/1969 | Johnson et al. | 137/322 |
| 3,494,373 A | * | 2/1970 | Horak et al. | 137/322 |
| 3,596,810 A | * | 8/1971 | Taubenheim | 137/212 |
| 3,687,340 A | * | 8/1972 | DeLaHunt | 222/400.7 |
| 4,180,189 A | * | 12/1979 | Zurit et al. | 222/400.7 |
| 4,350,273 A | * | 9/1982 | Nezworski et al. | 222/400.7 |
| 4,411,287 A | * | 10/1983 | Hyde | 137/322 |
| 5,901,747 A | | 5/1999 | Rokkjaer | 137/322 |
| 5,944,229 A | | 8/1999 | Rokkjaer | 222/400.7 |
| 6,196,522 B1 | | 3/2001 | Yuen | 251/149.5 |

* cited by examiner

Primary Examiner—George L. Walton
(74) Attorney, Agent, or Firm—James E. Brunton (57) ABSTRACT

A liquid transfer system that includes a valve and coupler assembly of unique design for use in extracting hazardous fluids from a transport container. The system includes a novel valve and coupler assembly that is of a simple design and is uniquely constructed from a corrosive resistant plastic that is substantially impervious to most corrosive liquids.

19 Claims, 10 Drawing Sheets

CORROSIVE RESISTANT LIQUID EXTRACTION APPARATUS

BACKGROUND OF THE INVENTION

1. Field of the Invention

The present invention relates generally to systems for the filling, transport, and emptying of liquid containers More particularly, the invention concerns a novel, corrosion resistant liquid extraction apparatus that includes a novel plastic valve that can be removably connected to a liquid transport container. In turn, the valve can be interconnected with a specially configured, corrosion-resistant, plastic coupler that operates the valve in a manner to enable fluid to be extracted from the container.

2. Discussion of the Prior Art

The storage and transport of liquids and particularly the storage and transport of hazardous liquids have long presented substantial problems. For many years liquids were stored and transported in throwaway type metal and plastic containers. Typically, such containers were provided with a threaded liquid outlet port, which, after the container was filled, was closed, by some type of threaded cap. The use of these types of containers was costly, inefficient and often hazardous, particularly when the containers were used to store and transport potentially dangerous chemicals.

In recent years substantial efforts have been made to develop new systems to improve container and drum management capabilities, minimize user exposure to hazardous materials and address emerging governmental regulations. These efforts have resulted in the development of several different types of reusable systems for transferring liquid formulations from returnable closed drums and containers. As a general rule, these systems to a greater, or lesser extent, simplify drum emptying, minimize operator hazards, improve cleanliness and eliminate costly waste inherent in prior art disposable container systems. One of the most advanced of such improved systems was developed by and is presently commercially available from Micro Matic, Inc. of Northridge, Calif.

The Micro Matic system, which is described in U.S. Pat. No. 5,901,747 issued to the present inventor, basically comprises a two-part system that includes a coupler operated extractor valve which can be interconnected with a conventional drum via existing threaded connections and a cooperating coupler which connects to the extractor valve to allow drum emptying through the use of a remote pumping system. The extractor valve apparatus includes a valve body and a down tube connected to the valve body, which extends to the bottom of the drum to permit the complete transfer of liquid from the drum.

Another Micro Matic prior art liquid transfer system is described in U.S. Pat. No. 5,944,229 also issued to the present inventor. This invention concerns a novel, tamper-proof, safety valve system that includes a tamper evident valve closure cap that must be broken before liquid can be removed from the container.

The Micro Matic systems, while representing the best of the current state of the art liquid transfer systems, have certain drawbacks which are sought to be overcome by the system of the present invention More particularly, the metal valve and coupler assemblies of the Micro Matic systems are of a relatively complex design making them somewhat difficult and costly fabricate. Further, in some respects these metal assemblies are not well suited for use with various types of hazardous and highly corrosive chemicals that are frequently stored and transported.

As will be better appreciated from the discussion that follows, unlike the prior art Micro Matic systems, the novel valve and coupler of the improved system of the present invention are of an elegantly simple design and are uniquely constructed from a corrosive resistant plastic that is substantially impervious to most corrosive liquids. Additionally, the improved system provides a customer unique, key type coupler-valve mating interface that precludes removal of the drum contents by unauthorized persons

SUMMARY OF THE INVENTION

It is an object of the present invention to provide a novel liquid transfer system that includes a valve and coupler assembly of unique design for use in extracting hazardous fluids from a transport container. More particularly, it is an object of the invention to provide a liquid transfer system of the aforementioned character that includes a novel valve and coupler assembly that is of a simple design and is uniquely constructed from a corrosive resistant plastic that is substantially impervious to most corrosive liquids.

Another object of the invention is to provide a system of the character described which improves container and drum management while at the same time significantly reducing the material and labor costs inherent in the fabrication of the prior art liquid transfer systems.

Another object of the invention is to provide a liquid transfer system, which includes a novel plastic valve mechanism, which can be readily removably connected to a container such as a metal or plastic drum, and a novel, plastic coupler mechanism that can be removably coupled with the plastic valve mechanism for operating the valve mechanism. An important aspect of the liquid transfer system resides in the fact that the valve mechanism is specially configured so that only a coupler of a special, mating configuration can be interconnected with the valve mechanism. In this way, couplers and valves can be custom designed for individual users and use of or tampering with containers belonging to the individual user by users of similar systems is positively prevented.

Another object of the invention is to provide a fluid transfer system of the aforementioned character, which is highly reliable in operation, has a long useful life and is easy to use with a minimum amount of instruction being required.

Another object of the invention is to provide a system of the character described in the preceding paragraphs, which is inexpensive to produce and requires minimum maintenance.

In summary, the novel liquid transfer system of the present invention includes a valve and coupler assembly of unique design and a remote pump means that can be connected to the coupler to extract hazardous fluids from a transport container. The plastic valve of the system comprises a valve body that is connected to the container, which includes a coupler receiving portion and a hollow skirt portion, the hollow skirt portion having a spiral groove formed therein. An insert having a central bore is sealably received within the skirt portion for rotational movement by the coupler between a first valve closed position and a second valve open position. A down tube assembly is connected to the valve body and includes a stem portion that is sealably received within the central bore of the insert. The coupler of the liquid transfer system, which includes a fluid outlet passageway in communication with the fluid passageway of the down tube assembly, can be conveniently, removably connected to the valve body for imparting rotation to the insert. The plastic valve further includes a radially outwardly extending protuberance that is closely receivable within said spiral groove of the skirt portion of said valve body and the coupler receiving portion of the valve body is provided with circumferentially spaced openings which receive circumferentially spaced blades provided on the coupler. The insert of the plastic valve, in turn, includes upstanding fingers that are engagable by the spaced-apart blades when the coupler is connected to said valve body. In one form of the invention, the coupler also includes a downwardly extending first sleeve, an upwardly extending second sleeve telescopically received within the first sleeve and biasing means for yieldably resisting telescopic movement of the second sleeve into the first sleeve.

DESCRIPTION OF THE INVENTION

Figure 1:
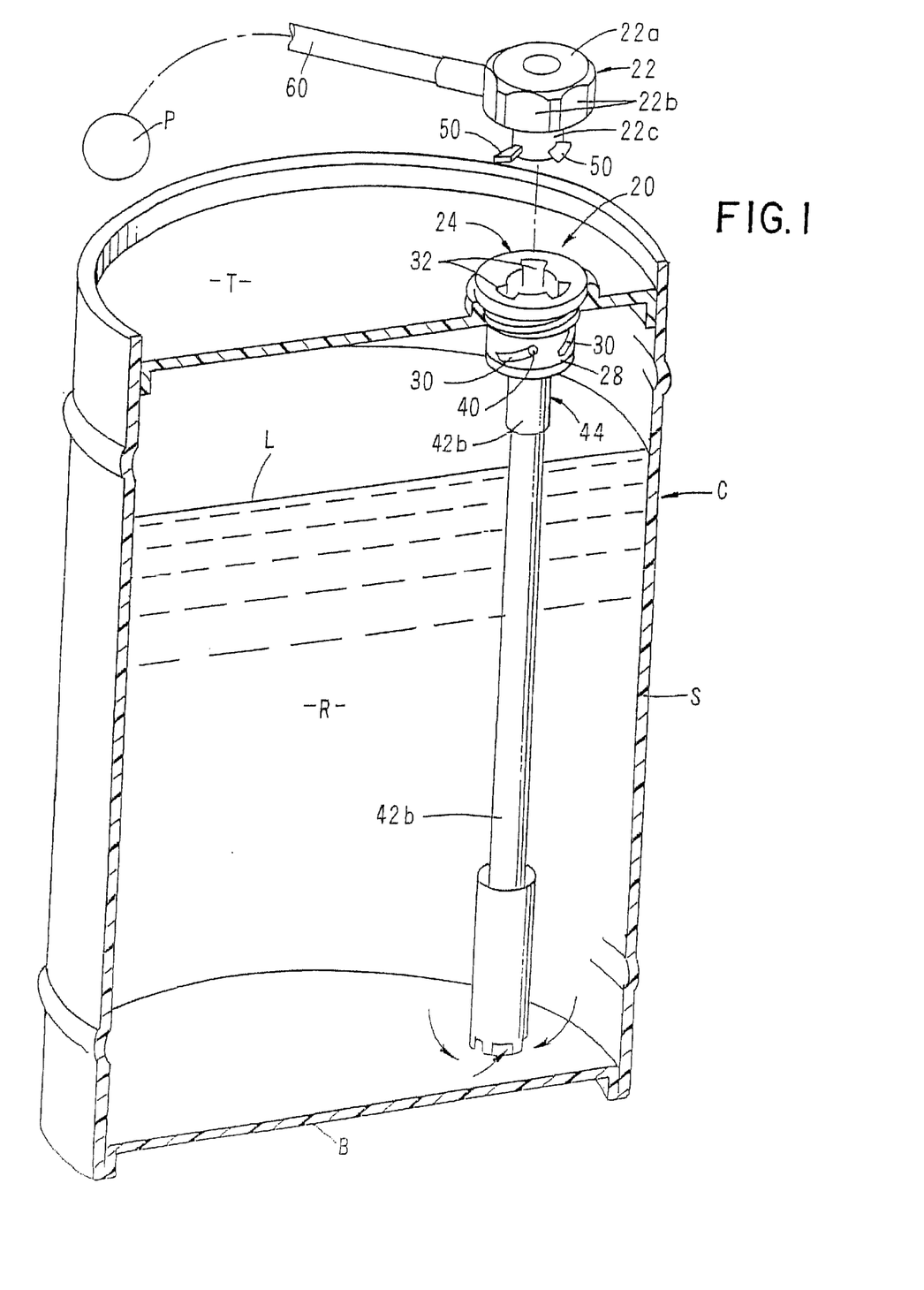
FIG. 1 is a generally perspective, exploded view of one form of the liquid transfer system of the invention showing the fluid container broker away to reveal internal construction.
Figure 2:
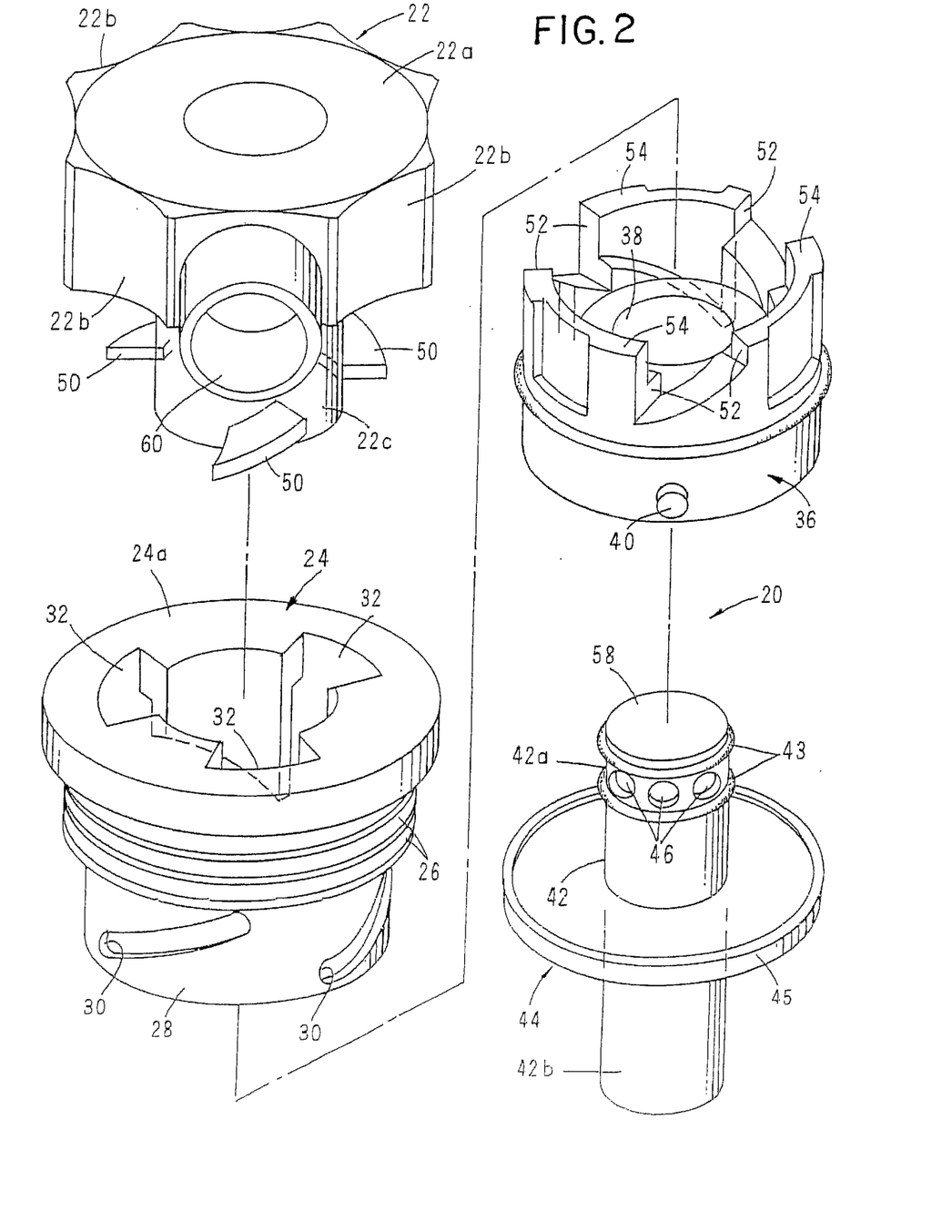
FIG. 2 is a generally perspective exploded view of one form of the coupler assembly and valve assembly of the invention.

Referring to the drawings and particularly to FIG. 1, one form of the apparatus is there shown interconnected with a conventional liquid transport container "C". Container "C" includes interconnected top, bottom and side walls "T", "B", and "S" respectively that define a liquid reservoir "R". The apparatus of the invention here comprises a valve assembly 20 that is threadably connected with top wall "T" of the container, a coupler assembly 22 that can be removably interconnected with valve assembly 20 and a remotely located pumping means "P" for pumping the liquid "L" from the transport container. As best seen in FIG. 2, valve assembly 20 comprises a valve body 24 that is threadably connected to top wall "T" of container "C" by conventional threads 26 formed on the valve body. Valve body 24 includes a tubular shaped skirt portion 28 that is provided with a plurality of circumferentially spaced, curved grooves 30, the purpose of which will presently be described. The top wall 24a of valve body 24 is provided with a plurality of circumferentially spaced irregularly shaped openings 32 which here are generally fan shaped.

Figures 5, 6:
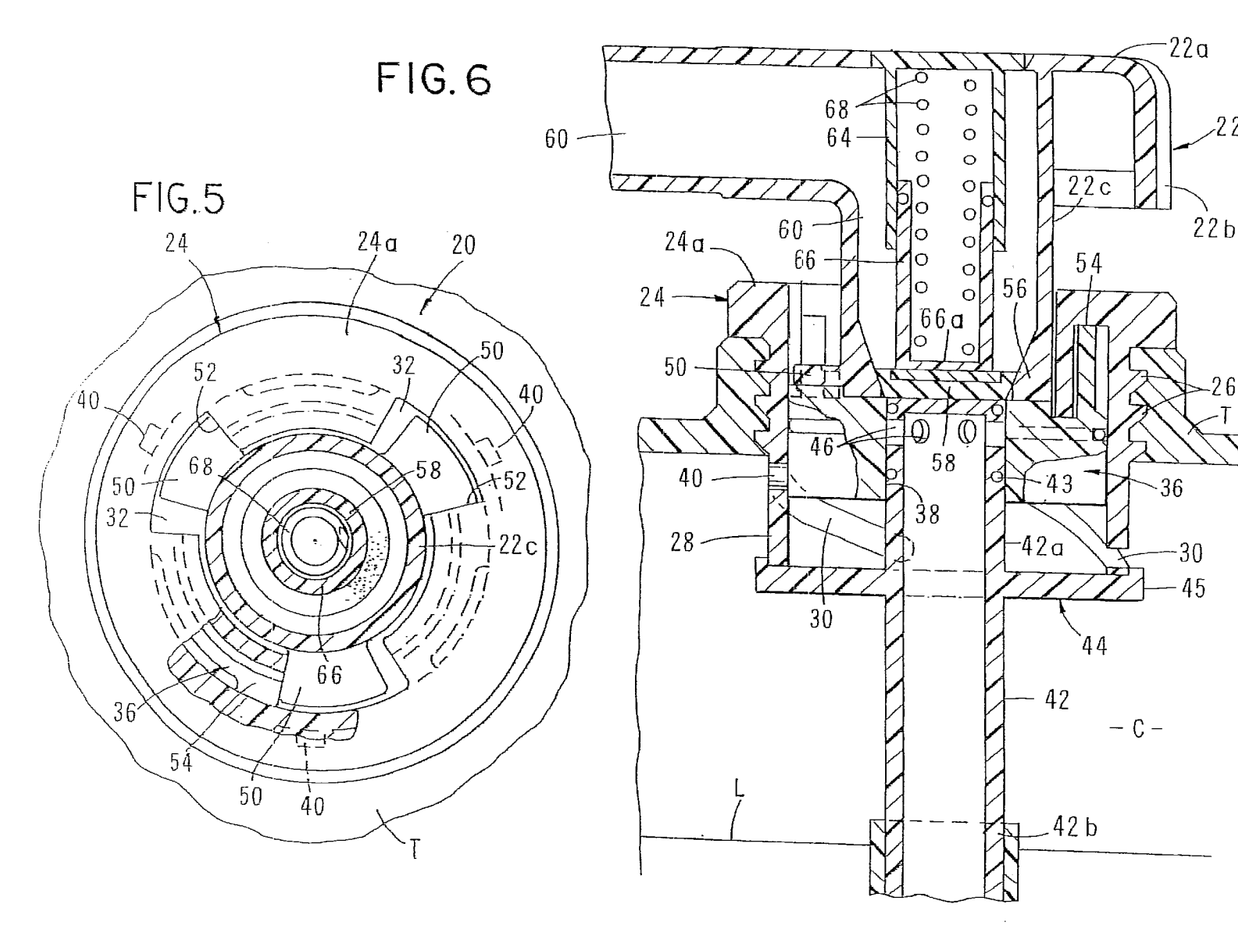
FIG. 5 is a cross-sectional view taken along lines 5—5 of FIG. 4.
FIG. 6 is a cross-sectional view taken along lines 6—6 of FIG. 4.

Valve assembly 20 farther includes a generally cylindrically shaped insert 36 that is rotatably received within skirt portion 28 of valve body 24. In a manner presently to be described, insert 36 can be moved by the coupler assembly 22 from a first valve closed position to a second valve open position. As best seen in FIG. 6, insert 36 is provided with a central, generally cylindrically shaped bore 38 that telescopically receives upper portion 42a of stem 42 which forms a part of a down tube assembly generally designated by the numeral 44 (FIG. 2). Down tube assembly 44 also includes a flange portion 45 that is interconnected with skirt 28 of valve body 24 in the manner shown in FIG. 6. As indicated in FIG. 6, stem 42 is connected to and extends both upwardly and downwardly from flange 46. The upper portion 42a of the stem, which carries an elastomeric O-ring 43, is sealably received within central bore 38 of insert assembly 36, while the lower portion 42b extends downwardly within reservoir "R". As indicated in FIG. 2, the upper portion 42a of stem 42 is provided with a plurality of circumferentially spaced fluid passageways 46. As will presently be described, when the coupler assembly 22 is interconnected with the valve assembly and is rotated into the valve-open position, fluid passageways 46 will move into communication with an outlet passageway formed in coupler assembly 22, which, in turn, communicates with the pumping means "P" (FIG. 1).

Turning particularly to FIGS. 2 and 6, the novel coupler assembly of the present invention can be seen to comprise an upper gripping portion 22a having finger gripping segments 22b and a lower, downwardly extending, generally tubular portion 22b. Affixed to portion 22b of the coupler assembly are circumferentially spaced blade-like members 50 which engage circumferentially spaced surfaces 52 formed on a plurality of upstanding, finger-like portions 54 that comprise a part of insert 36.

Figure 4:
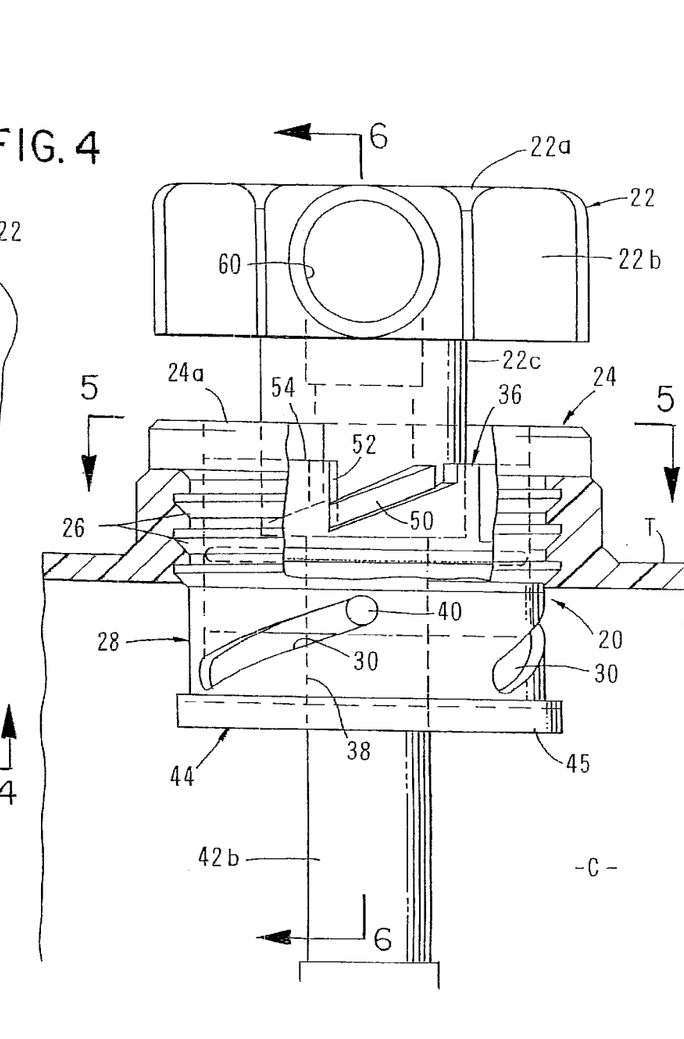
FIG. 4 is a view taken along lines 4—4 of FIG. 3, partly broken away to show internal construction.
Figure 7:
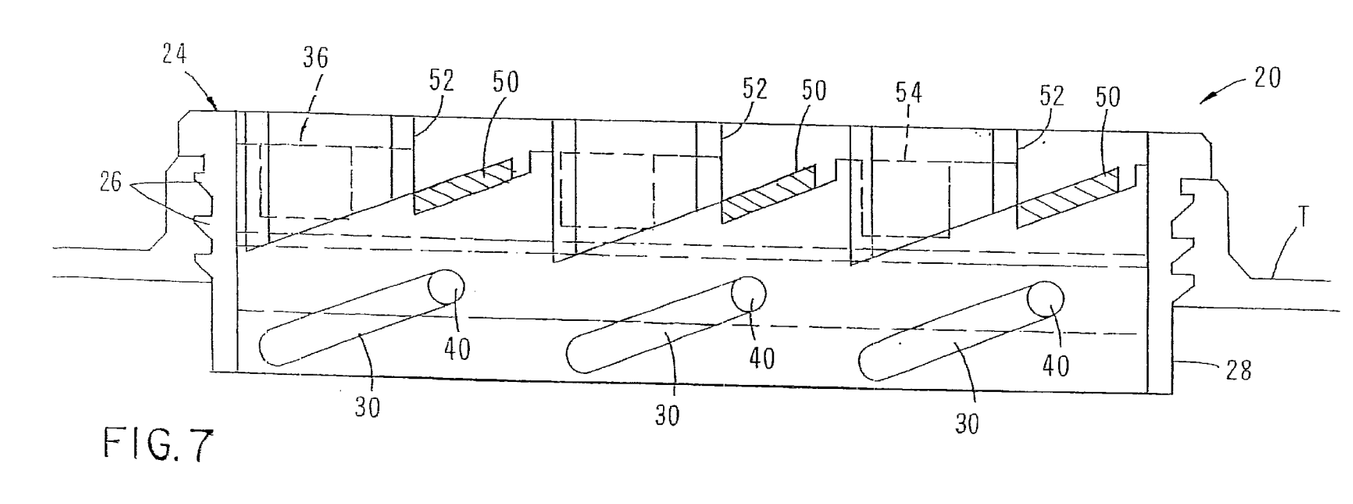
FIG. 7 is a planer projection of the upper portion of the valve assembly of the invention and the lower portion of the coupler assembly showing the manner in which the coupler blades interact with the valve assembly.
Figure 12:
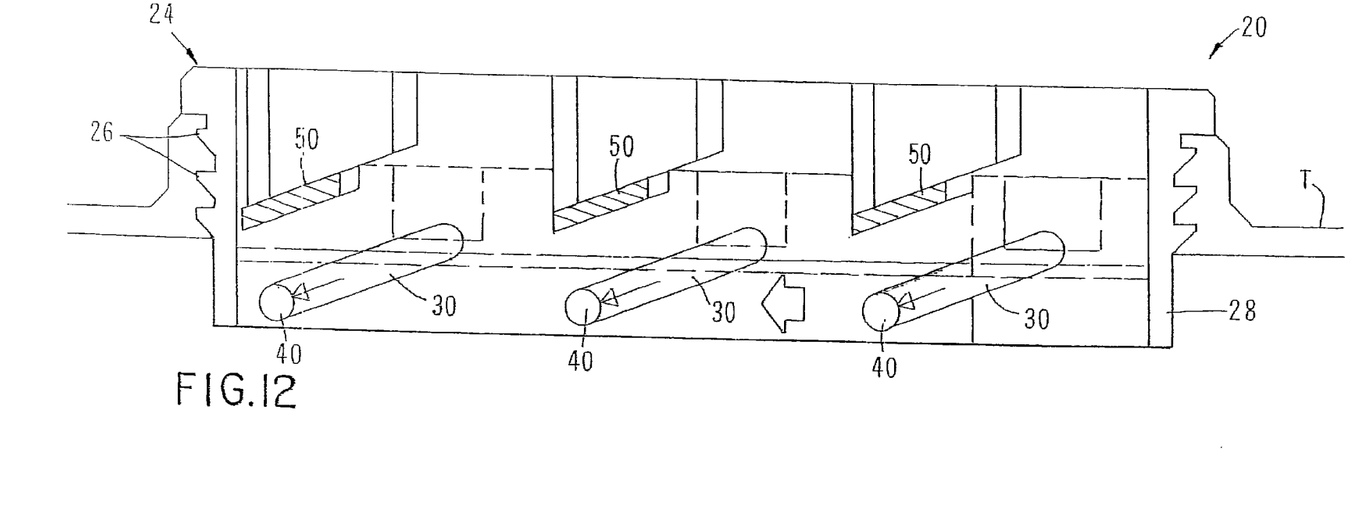
FIG. 12 is a planer projection similar to FIG. 7, but showing the valve assembly having been moved into a valve open configuration.

As indicated in FIG. 4, when the coupler assembly 22 is mated with the valve assembly, the generally fan shaped blades 50 will be received within the fan shaped openings 32 and the edges thereof will engage walls 52 of fingers 54 upon rotation of the coupler. With this construction, rotation of coupler assembly 22 relative to valve assembly 24 will cause blades 50 to impart rotation to insert 24 between the first valve closed position shown in FIG. 6 and the second valve open position shown in FIG. 11. In this regard, it is to be noted that protuberances 40 of insert 36 are received within curved grooves or slots 30 so that, upon rotation of insert 36 by the coupler assembly 22, protuberances 40 will move along grooves 30 urging downward movement of insert 36 from the valve closed position shown in FIG. 6 to the valve open position shown in FIG. 11 (see also FIGS. 7 and 12).

As indicated in FIG. 6, when the valve is in the closed position, a valve seat-engaging sleeve 56 formed on coupler assembly 22 will sealably engage a valve seat 58 formed on upper stem portion 42a. When the valve is in the valve open position illustrated in FIG. 11, it is to be noted that outlet passageways 46 provided in stem portion 42a can freely communicate with outlet passageway 60 formed in coupler assembly 22 and with the pumping means (FIG. 1). Accordingly, when the valve is in the valve open position shown in FIG. 11, upon urging of the pumping means, the liquid "L" can be drawn from the container "C" upwardly through the down tube assembly in the direction of the arrow 61 in FIG. 11, through outlet passageways 46, into passageway 60 and then outwardly of the apparatus in a direction toward the pump means "P". Pump means "P" can comprise any suitable commercially available pump of a character well understood by those skilled in the art.

Figures 10, 11:
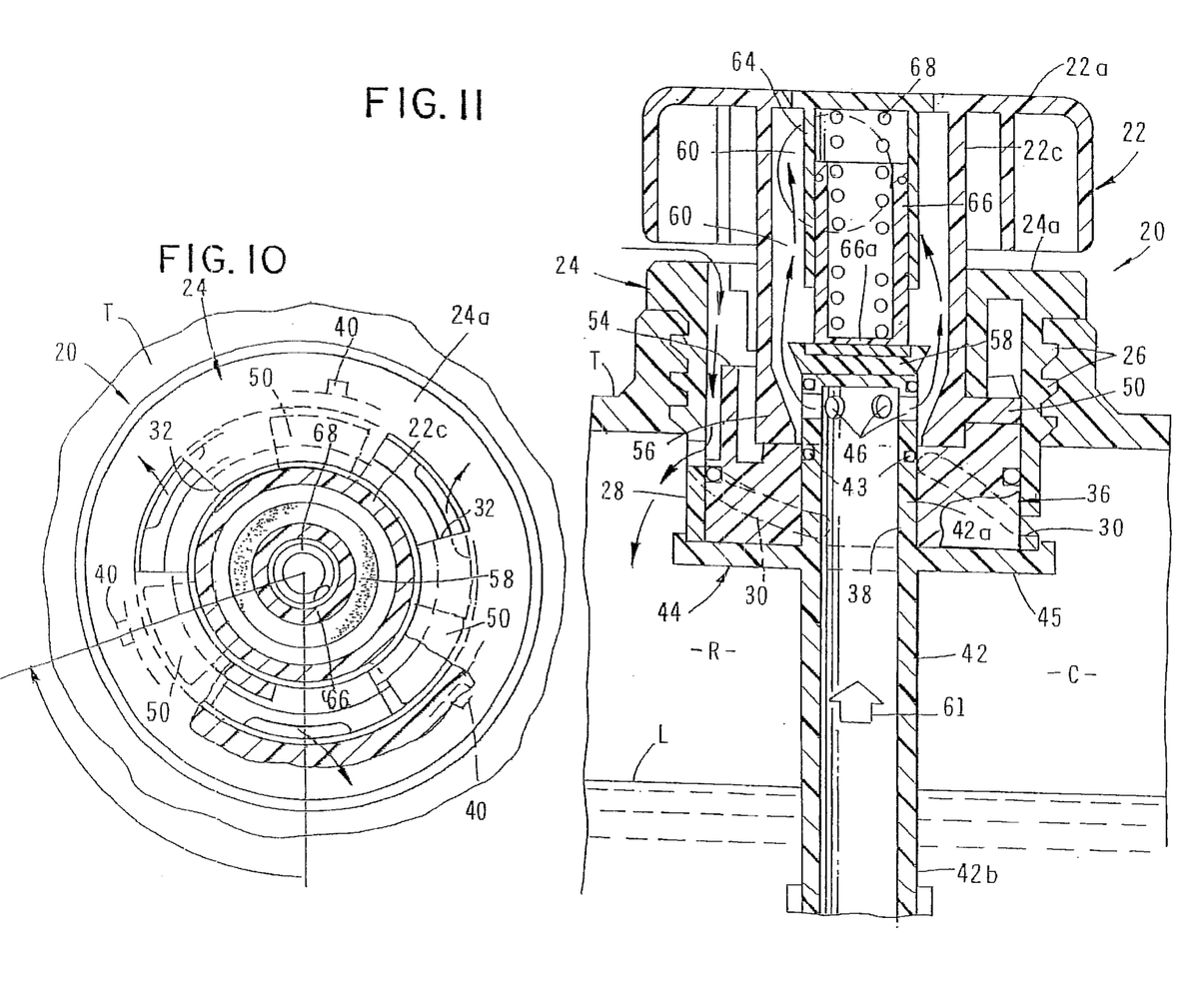
FIG. 10 is a cross-sectional view taken along lines 10—10 of FIG. 9.
FIG. 11 is a cross-sectional view taken along lines 11—11 of FIG. 9.

As illustrated in FIGS. 6 and 11, coupler assembly 22 includes a downwardly extending sleeve 64 which telescopically receives an upwardly extending sleeve 66. Sleeve 66 terminates in an end wall 66a that engages the top of valve seat 58. Disposed within sleeves 64 and 66 is biasing means for yieldably resisting telescopic movement of second sleeve 66 into first sleeve 64. This biasing means is here provided in the form of a conventional coil spring 68. As indicated in FIG. 11, as the coupler assembly is rotated into the valve open position there shown, spring 68 will be compressed in a manner that will urge coupler 22 to return to its upward, valve closed position as shown in FIG. 6.

Figure 3:
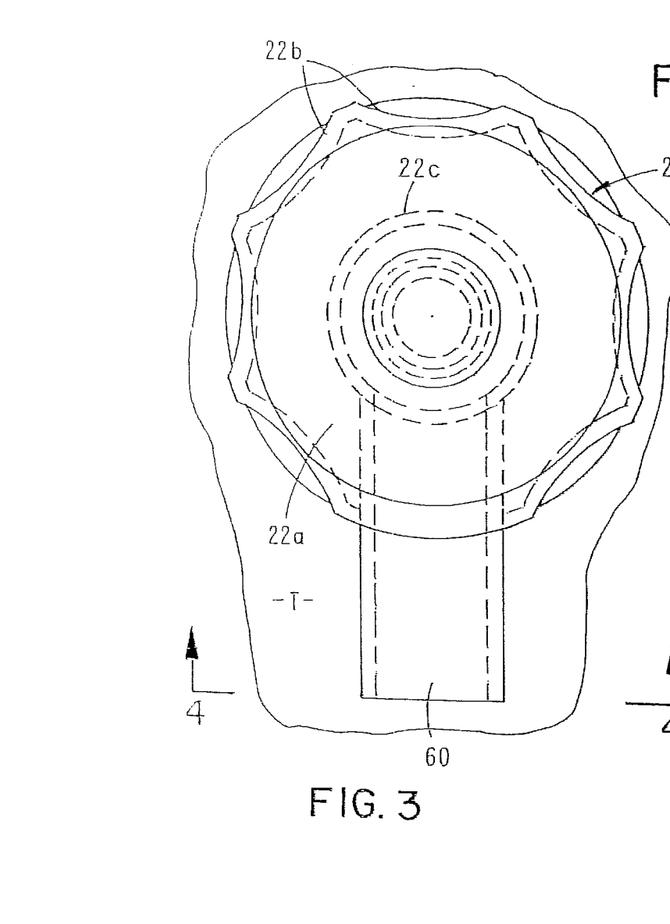
FIG. 3 is a greatly enlarged fragmentary top plan view of a portion of the system shown in FIG. 1.
Figures 8, 9:
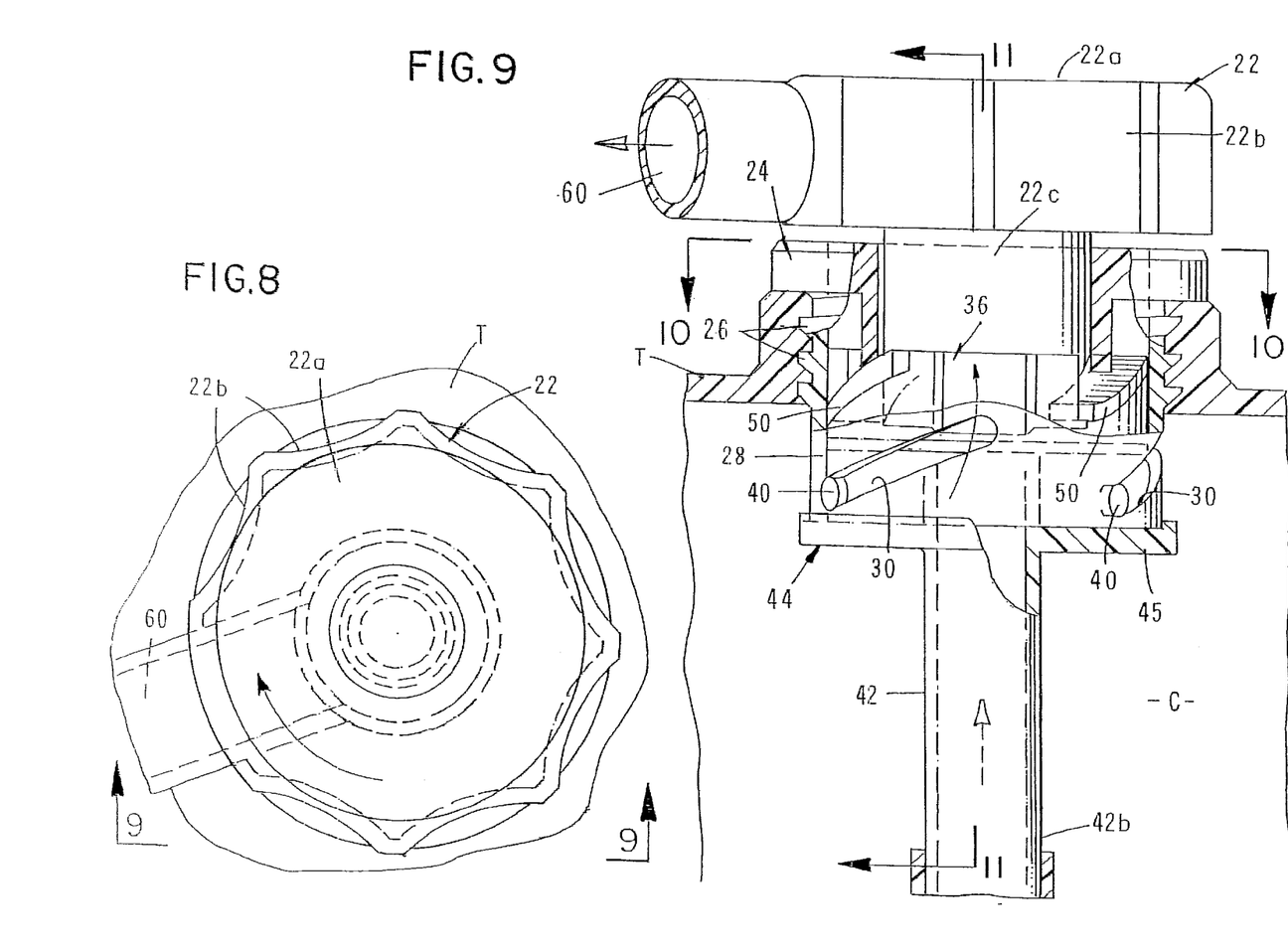
FIG. 8 is a view similar to FIG. 3 but showing the coupler moved into a valve open position.
FIG. 9 is a cross-sectional view similar to FIG. 4, but showing the valve assembly in a valve open configuration.

With the construction described in the preceding paragraphs, as the coupler assembly is rotated relative to the valve assembly, from the position shown in FIGS. 3 and 4 to the position shown in FIGS. 8 and 9, valve seat engaging sleeve 56 will move telescopically downwardly over the upper portion 42a of stem 42 against the urging of the biasing means or spring 68. When the coupler assembly reaches the position shown in FIG. 11, valve seat engaging sleeve 56 will have moved telescopically downwardly relative to stem portion 42a to a position where outlet passageways 46 are in fluid communication with passageway 60 formed in coupler assembly 22. With the apparatus in the valve-open position, energization of pump "P" will, of course, cause fluid to be drawn from the container "C" outwardly of the apparatus in the direction toward pump "P". Rotation of coupler assembly 22 in the opposite direction will, of course, cause the apparatus to return to the valve closed position shown in FIG. 6 where sleeve 56 will sealably engage valve seat 58.

Figures 13, 14:
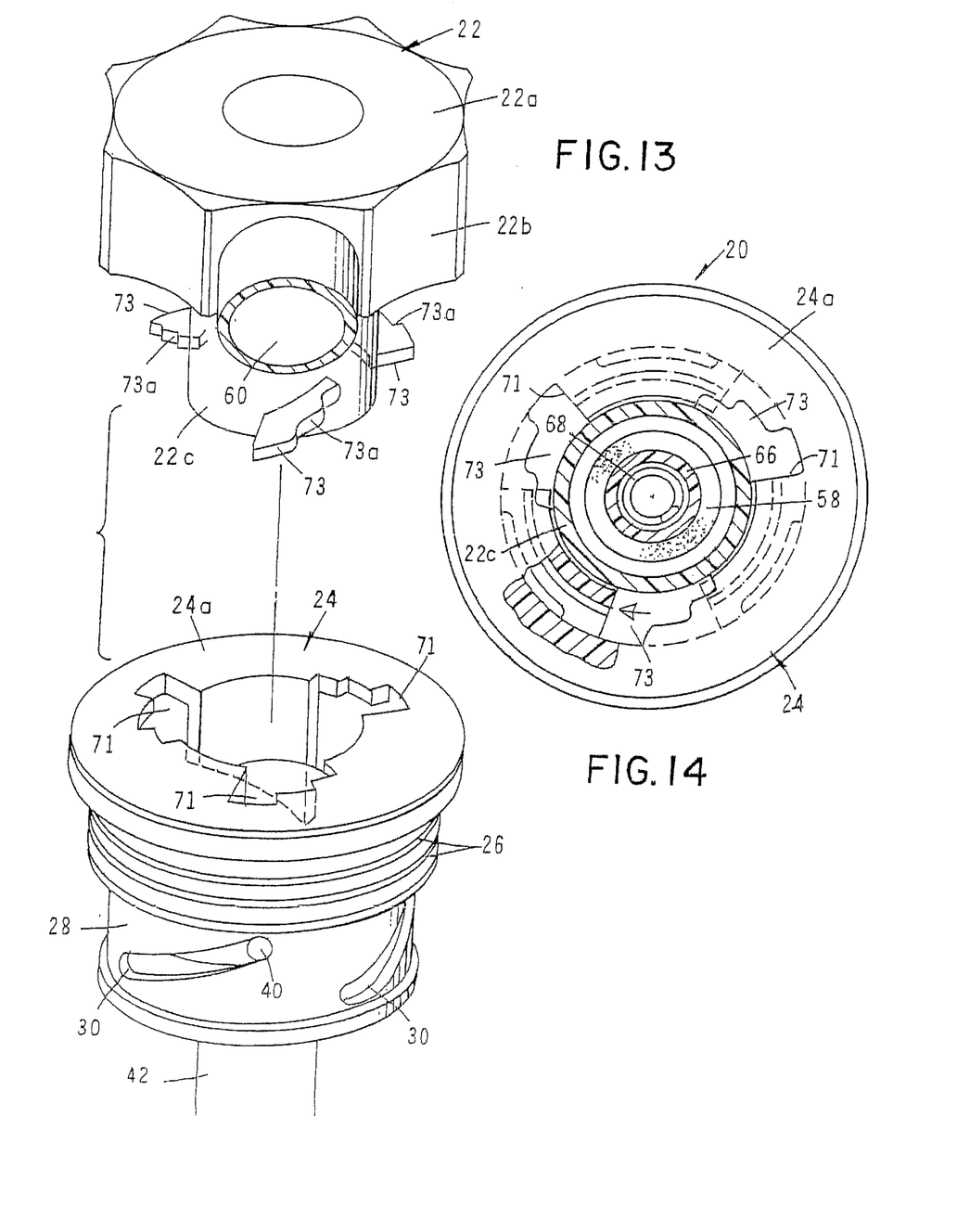
FIG. 13 is a generally perspective, exploded view of an alternate form of the valve and coupler assembly of the invention.
FIG. 14 is a top plan view of the assembly shown in FIG. 13, partly broken away to show internal construction.

Turning to FIGS. 13 and 14, an alternate form of the apparatus of the invention is there shown. This form of the invention is similar in most respects to that shown in FIGS. 1 through 12 and like numerals are used to identify like components. However, in the embodiment of the invention shown in FIGS. 13 and 14, the circumferentially spaced openings 71 formed in the valve body are of a slightly different configuration as are the blades 73 of the coupler assembly. More particularly, as indicated in FIG. 13, blades 73 are provided with a plurality of key-like shoulders 73a that are closely received within the keyhole-like openings 71 provided in the valve assembly. It is apparent that, unless the coupler is provided with the correctly configured blades, the coupler cannot be used in conjunction with the valve body 24 of the character shown in FIG. 13.

Figures 15, 16:
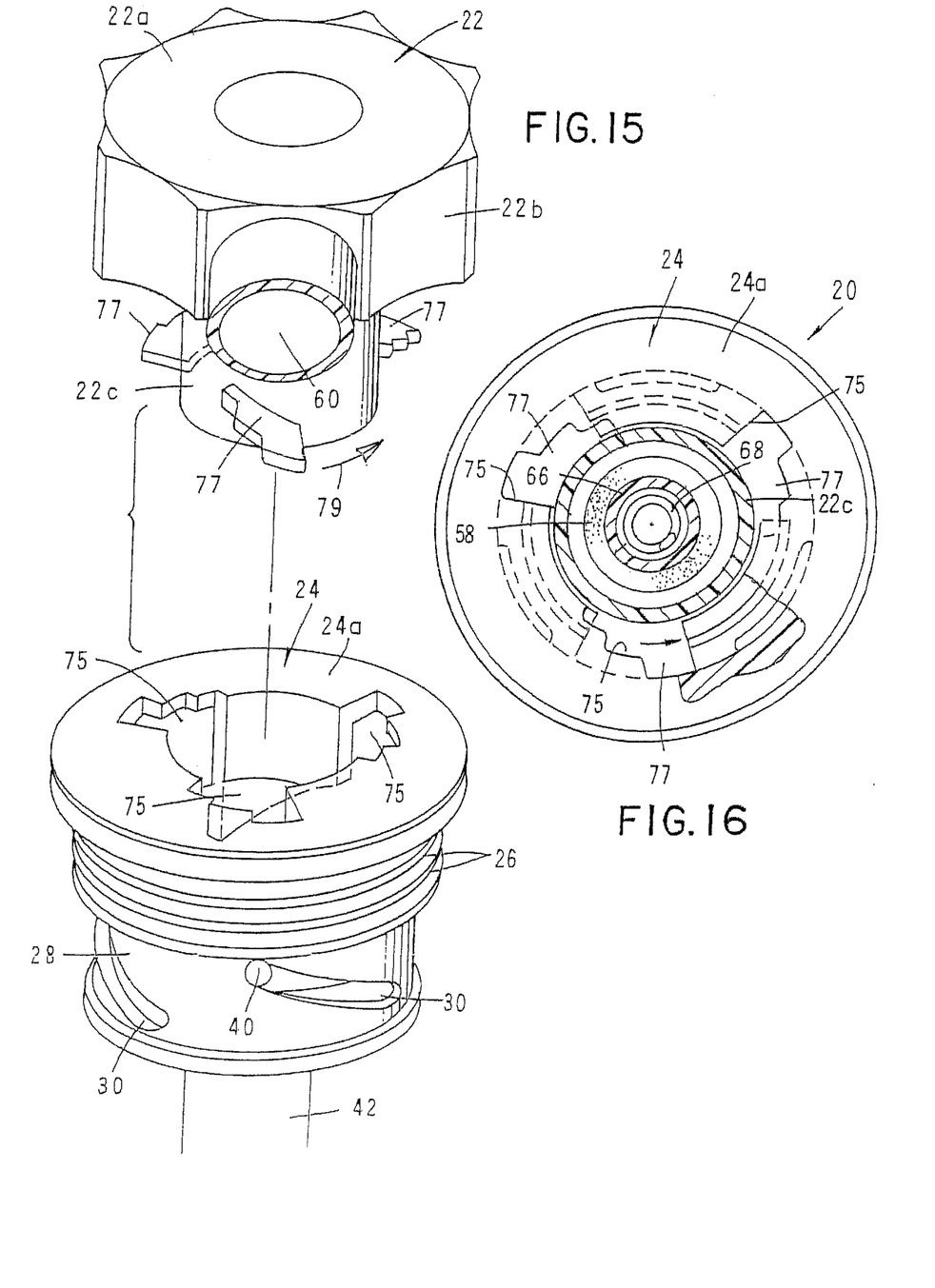
FIG. 15 is a generally perspective, exploded view of yet another embodiment of the invention.
FIG. 16 is a top plan view of the embodiment shown in FIG. 15 partly broken away to show internal construction.

Turning to FIGS. 15 and 16, still another form of the apparatus of the invention is there shown. Once again, this apparatus is similar to that previously described and like numerals are used to identify like components. In the embodiment of the invention shown in FIGS. 15 and 16, the circumferentially spaced openings 75 formed in the valve assembly are of a different configuration from that shown in FIGS. 1 through 12, but are similar to those shown in FIGS. 13 and 14. Similarly, the blades 77 formed on the coupler assembly are of a different configuration from those shown in FIGS. 1 through 12. However, the blades in the apparatus shown in FIGS. 15 and 16 are of similar configuration to those shown in FIGS. 13 and 14. Although this is the case, as indicated by the arrow 79 in FIG. 15, in this latest embodiment of the invention, the coupler is rotated in a counterclockwise direction rather than a clockwise direction to move valve assembly from a valve closed position to a valve open position. Once again, with this important distinction, unless the coupler is provided with properly configured blades 77, the coupler cannot be used with the valve assembly having the configuration shown in FIG. 15.

Figures 17, 18:
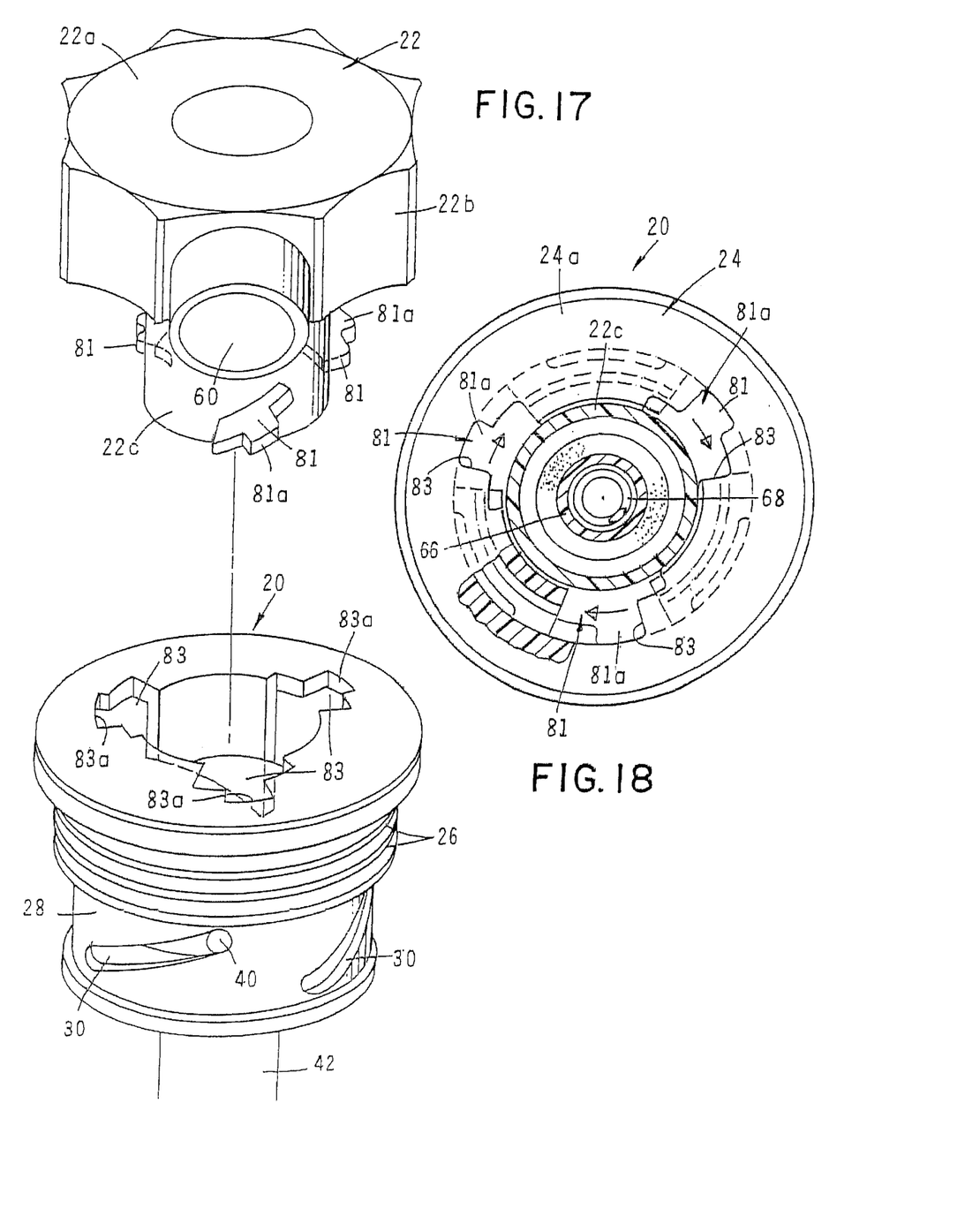
FIG. 17 is a generally perspective view of still another form of the coupler and valve assembly of the invention.
FIG. 18 is a top plan view of the assemblage shown in FIG. 17 partly broken away to shown internal construction.

Referring next to FIGS. 17 and 18, yet another form of the apparatus of the invention is there shown. Again, this form of the apparatus is similar in most respects to the apparatus previously described and like numerals are used in FIGS. 17 and 18 to identify like components. In this latest embodiment of the invention, it is to be noted that the operating blades 81 of the coupler assembly and the openings 83 provided in the valve assembly are once again of a different configuration. More particularly, as best seen in FIG. 17, blades 81 include a central radially outwardly extending protuberance 81a that is received within a notch-like opening 83a that forms a part of each of the blade receiving openings of the valve assembly.

It is clear from a study of FIGS. 13 through 18 that the coupler assemblies as well as the valve assemblies can be specially configured for particular customer so that only couplers belonging to that customer can be used to operate valves belonging to the customer.

It is to be understood that the configuration of the blades and openings of the apparatus shown in the drawings is only exemplary, and that any number of mating configurations of blades and openings can be provided to the customer.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for extracting liquids from a container comprising:
  (a) a valve assembly connected to the container comprising:
    (i) a valve body having a coupler receiving portion and a generally tubular shaped, reduced diameter portion, said generally tubular shaped, reduced diameter portion being fixedly connected to said coupler receiving portion and have a curved groove formed therein;
    (ii) an insert sealably received within said generally tubular shaped portion for rotation with respect thereto between a first valve closed position and a second valve open position, said insert having a central bore;
    (iii) a down tube assembly connected to said valve body, said down tube assembly including a stem portion sealably received within said central bore of said insert said stem portion having a fluid passageway;

(b) a coupler assembly removably connected to said valve body for imparting rotation to said insert, said coupler having a fluid outlet passageway in communication with said fluid passageway of said down tube assembly; and (c) pump means connected to said coupler for drawing liquid through said fluid outlet passageway.

2. The apparatus as defined in claim 1 in which said insert further includes a radially outwardly extending protuberance receivable within said curved groove of said skirt portion of said valve body.

3. An apparatus for extracting corrosive liquids from a container comprising:
 (a) a valve assembly connected to the container comprising:
  (i) a valve body threadably connected to the container, said valve body having a first enlarged diameter coupler receiving portion and a reduced diameter hollow skirt portion integrally formed with said first enlarged diameter coupler receiving portion, said hollow skirt portion having a plurality of circumferentially spaced grooves formed therein;
  (ii) an insert sealably, rotatably received within said skirt portion for movement between a first valve closed position and a second valve open position, said insert having a central bore and a plurality of circumferentially spaced, radially outwardly extending protuberances receivable within said grooves of said skirt portion of said valve body;
  (iii) a down tube assembly comprising:
   a. a flange portion connected to said valve body, said flange portion including a peripheral portion connected to and circumscribing said skirt portion thereof; and
   b. a stem portion connected to and extending from said flange portion, said stem portion being sealably received within said central bore of said insert and having a fluid passageway;
 (b) a coupler assembly removably connected to said valve body for movement between a first position and a second position to impart rotation to said insert, said coupler assembly having a fluid outlet passageway in communication with said fluid passageway of said stem portion of said down tube assembly.

4. The apparatus as defined in claim 3 in which said stem portion of said down tube assembly includes a valve seat and in which said coupler assembly includes a valve seat engaging sleeve for sealably engaging said valve seat when said coupler is in a first position.

5. An apparatus for extracting corrosive liquids from a container comprising:
 (a) a valve assembly connected to the container comprising:
  (i) a valve body threadably connected to the container, said valve body having a coupler receiving portion and a tubular skirt portion, said tubular skirt portion having a plurality of circumferentially spaced curved grooves formed therein, said valve body further including a plurality of circumferentially spaced, irregularly shaped openings;
  (ii) an insert sealably, rotatably received within said skirt portion for movement between a first valve closed position and a second valve open position, said insert having a central bore and including:
   a. a plurality of circumferentially spaced, radially outwardly extending protuberances receivable within said curved grooves of said skirt portion of said valve body; and
   b. a plurality of circumferentially spaced, upstanding fingers;
  (iii) a down tube assembly comprising:
   a. a flange portion connected to said valve body, said flange portion including a peripheral portion connected to and circumscribing said skirt portion of said valve body; and
   b. a stem portion connected to and extending from said flange portion, said stem portion being sealably received within said central bore of said insert and having a fluid passageway; and
 (b) a coupler assembly removably connected to said valve body for movement between a first position and a second position to impart rotation to said insert, said coupler assembly having a fluid outlet passageway in communication with said fluid passageway of said stem portion of said down tube assembly and further including:
  (i) a plurality of circumferentially spaced irregularly shaped blades closely receivable within said circumferentially spaced openings of said valve body, said blades being engageable with said circumferentially spaced upstanding fingers of said insert;
  (ii) a downwardly extending first sleeve;
  (iii) an upwardly extending second sleeve telescopically received within said first sleeve; and
  (iv) biasing means for yieldably resisting telescopic movement of said second sleeve into said first sleeve; and
 (c) pumping means connected to said coupler for pumping liquid through said fluid outlet passageway.

6. The apparatus as defined in claim 5 in which said stem portion of said down tube assembly includes a valve seat and in which said coupler includes a valve seat engaging sleeve for sealably engaging said valve seat when said coupler is in a first position.

7. The apparatus as defined in claim 6 in which said valve seat engaging sleeve circumscribes said stem portion of said down tube assembly and is movable with respect thereto when said coupler is moved into said second position.

8. The apparatus as defined in claim 5 in which said irregularly shaped openings in said valve body are generally fan shaped.

9. The apparatus as defined in claim 5 in which said irregularly shaped openings in said valve body are generally keyhole shaped.

10. The apparatus as defined in claim 5 in which said blades of said coupler assembly are generally fan shaped.

11. The apparatus as defined in claim 10 in which said fan shaped blades each include a radially outwardly extending protuberance.

12. An apparatus for extracting liquids from a container comprising:
 (a) a valve assembly connected to the container comprising:
  (i) a valve body having a coupler receiving portion provided with circumferentially spaced openings and a generally tubular shaped portion, said generally tubular shaped portion have a curved groove formed therein;
  (ii) an insert sealably received within said generally tubular shaped portion for rotation with respect thereto between a first valve closed position and a second valve open position, said insert having a central bore;
  (iii) a down tube assembly connected to said valve body, said down tube assembly including a stem portion sealably received within said central bore of said insert said stem portion having a fluid passageway;
- (b) a coupler assembly removably connected to said valve body for imparting rotation to said insert, said coupler assembly having a fluid outlet passageway in communication with said fluid passageway of said down tube assembly and including circumferentially spaced blades receivable within said circumferentially spaced openings; and
- (c) pump means connected to said coupler for drawing liquid through said fluid outlet passageway.

13. The apparatus as defined in claim 12 in which said insert includes upstanding fingers engagable by said spaced apart blades when said coupler is connected to said valve body.

14. The apparatus as defined in claim 12 in which said coupler assembly further includes sealing means for sealably interconnecting said coupler assembly with said valve assembly.

15. An apparatus for extracting corrosive liquids from a container comprising:
- (a) a valve assembly connected to the container comprising:
  - (i) a valve body threadably connected to the container, said valve body having a coupler receiving portion provided with a plurality of circumferentially spaced, irregularly shaped openings and a hollow skirt portion, said hollow skirt portion having a plurality of circumferentially spaced grooves formed therein;
  - (ii) an insert sealably, rotatably received within said skirt portion for movement between a first valve closed position and a second valve open position, said insert having a central bore and a plurality of circumferentially spaced, radially outwardly extending protuberances receivable within said grooves of said skirt portion of said valve body;
  - (iii) a down tube assembly comprising:
    - a. a flange portion connected to said valve body, said flange portion including a peripheral portion connected to and circumscribing said skirt portion thereof; and
    - b. a stem portion connected to and extending from said flange portion, said stem portion being sealably received within said central bore of said insert and having a fluid passageway;
- (b) a coupler assembly removably connected to said valve body for movement between a first position and a second position to impart rotation to said insert, said coupler assembly having a fluid outlet passageway in communication with said fluid passageway of said stem portion of said down tube assembly and including a plurality of circumferentially spaced irregularly shaped blades closely receivable within said circumferentially spaced openings.

16. The apparatus as defined in claim 15 in which said insert includes a plurality of circumferentially spaced, upstanding fingers engagable by said circumferentially spaced-apart blades when said coupler is connected to said valve body.

17. An apparatus for extracting liquids from a container comprising:
- (a) a valve assembly connected to the container comprising:
  - (i) a valve body having a coupler receiving portion provided with circumferentially spaced openings and a generally tubular shaped portion, said generally tubular shaped portion have a curved groove formed therein;
  - (ii) an insert sealably received within said generally tubular shaped portion for rotation with respect thereto between a first valve closed position and a second valve open position, said insert having a central bore;
  - (iii) a down tube assembly connected to said valve body, said down tube assembly including a stem portion sealably received within said central bore of said insert said stem portion having a fluid passageway;
- (b) a coupler assembly removably connected to said valve body for imparting rotation to said insert, said coupler assembly having a fluid outlet passageway in communication with said fluid passageway of said down tube assembly and including circumferentially spaced members receivable within said circumferentially spaced openings; and
- (c) pump means connected to said coupler for drawing liquid through said fluid outlet passageway.

18. The apparatus as defined in claim 17 in which said insert further includes a radially outwardly extending protuberance receivable within said curved groove of said skirt portion of said valve body.

19. The apparatus as defined in claim 17 in which said insert includes a plurality of circumferentially spaced, upstanding fingers engagable by said circumferentially spaced-apart blades when said coupler is connected to said valve body.

* * * * *